United States Patent [19]
Hwang

[11] Patent Number: 5,934,222
[45] Date of Patent: Aug. 10, 1999

[54] ANIMAL DRINKING DEVICE

[76] Inventor: Yaw-Shiun Hwang, 58, Ma Yuan West St., Taichung, Taiwan

[21] Appl. No.: 09/058,749

[22] Filed: Apr. 10, 1998

[51] Int. Cl.$^6$ ..................................................... A01K 7/00
[52] U.S. Cl. ........................................... 119/72; 119/51.03
[58] Field of Search .................................... 119/51.03, 77, 119/72.5, 464, 477, 72, 51.5

[56] References Cited

U.S. PATENT DOCUMENTS

| | | | |
|---|---|---|---|
| 1,555,407 | 9/1925 | Ferris | 222/586 |
| 5,109,798 | 5/1992 | Impastato et al. | 119/51.03 |
| 5,301,634 | 4/1994 | Ho | 119/477 |

Primary Examiner—Robert P. Swiatek
Assistant Examiner—Son T. Nguyen

[57] ABSTRACT

An animal drinking device has a water container disposed on a water drawing device. A positioning clamp device clamps the water drawing device. The water container has an outer thread. The water drawing device has a hollow tube, an inner thread engaging with the outer thread, a hollow tube, a pipe connected to the hollow tube, a middle annular flange, a lower annular flange, and two elongated recesses. The pipe has an outlet receiving a ball. Two opposite semicircular plates are disposed on the pipe. The positioning clamp device has two opposite arms, an elastic neck, a push bar, and two protruded bars. Each opposite arm has a distal block. A support plate has a notch, two guide grooves, and two through holes. The protruded bars are inserted in the elongated recesses. Each distal block is inserted in the respective guide groove.

2 Claims, 5 Drawing Sheets

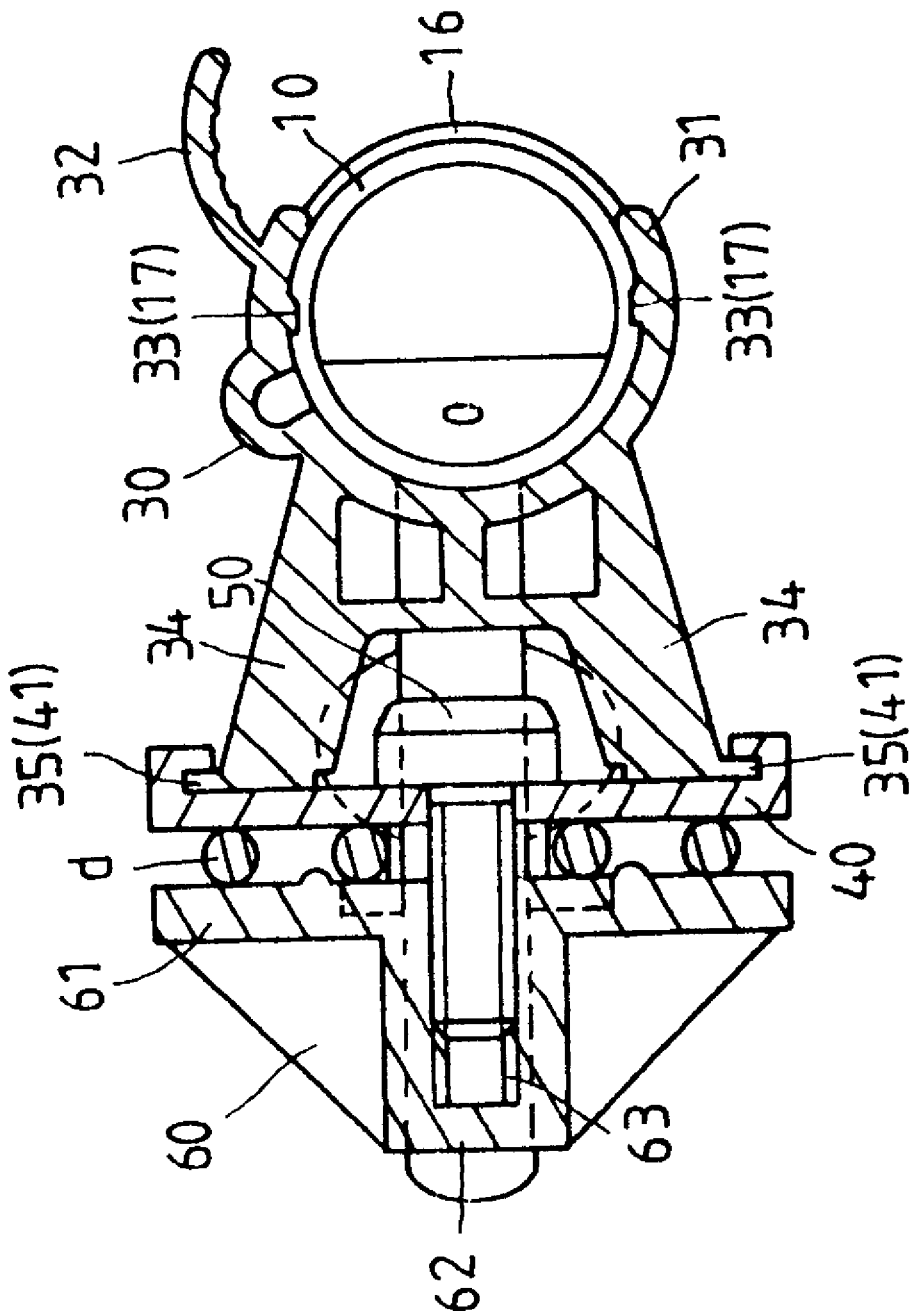
F I G. 5

ANIMAL DRINKING DEVICE

BACKGROUND OF THE INVENTION

The present invention relates to an animal drinking device. More particularly, the present invention relates to an animal drinking device which can be removed from an article easily.

A conventional animal drinking device has a water container and a pipe. The conventional animal drinking device is often positioned on a rail. However, the conventional animal drinking device cannot be removed from the rail easily.

SUMMARY OF THE INVENTION

An object of the present invention is to provide an animal drinking device which can be positioned on an article easily.

Another object of the present invention is to provide an animal drinking device which can be removed from an article easily.

In accordance with a first embodiment of the present invention, an animal drinking device comprises a water container, a water drawing device, a positioning clamp device, and a support plate. The water container is disposed on the water drawing device. The positioning clamp device clamps the water drawing device. The water container has an outer thread. The water drawing device has a hollow tube, an inner thread engaging with the outer thread, a hollow tube, a pipe connected to the hollow tube, a middle annular flange, a lower annular flange, and two elongated recesses. The pipe has an outlet receiving a ball. Two opposite semicircular plates are disposed on the pipe. The positioning clamp device has two opposite arms, an elastic neck, a push bar, and two protruded bars. Each of the opposite arms has a distal block. The support plate has a notch, two guide grooves, and two through holes. The protruded bars are inserted in the elongated recesses. Each distal block is inserted in the respective guide groove. Two screws fasten the support plate on a wall via the through holes.

In accordance with a second embodiment of the present invention, an animal drinking device comprises a water container, a water drawing device, a positioning clamp device, and a support plate. The water container is disposed on the water drawing device. The positioning clamp device clamps the water drawing device. The water container has an outer thread. The water drawing device has a hollow tube, an inner thread engaging with the outer thread, a hollow tube, a pipe connected to the hollow tube, a middle annular flange, a lower annular flange, and two elongated recesses. The pipe has an outlet receiving a ball. Two opposite semicircular plates are disposed on the pipe. The positioning clamp device has two opposite arms, an elastic neck, a push bar, and two protruded bars. Each of the opposite arms has a distal block. The support plate has a notch, two guide grooves, and two through holes. The protruded bars are inserted in the elongated recesses. Each distal block is inserted in the respective guide groove. The animal drinking device further comprises a bolt and a lock seat. The support plate is disposed between the bolt and the lock seat. The lock seat has a main body, an inner threaded sleeve, and two elongated ribs. The bolt has a threaded shank inserted in the inner threaded sleeve via the notch.

BRIEF DESCRIPTION OF THE DRAWINGS

FIG. 5 is a sectional assembly view of an animal drinking device of a second preferred embodiment in accordance with the present invention.

DETAILED DESCRIPTION OF THE INVENTION

Figure 1:
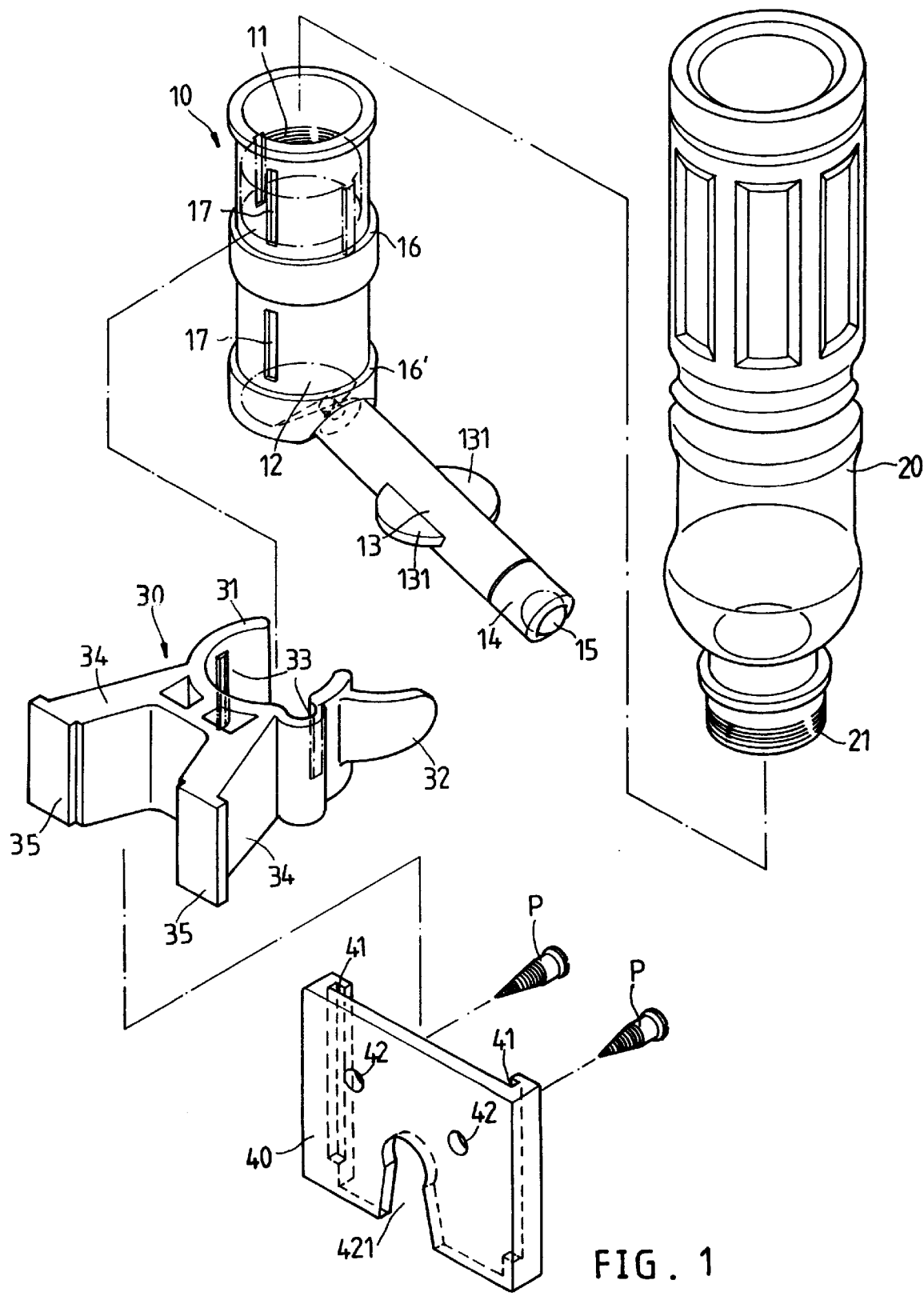
FIG. 1 is a perspective exploded view of an animal drinking device of a first preferred embodiment in accordance with the present invention.
Figure 2:
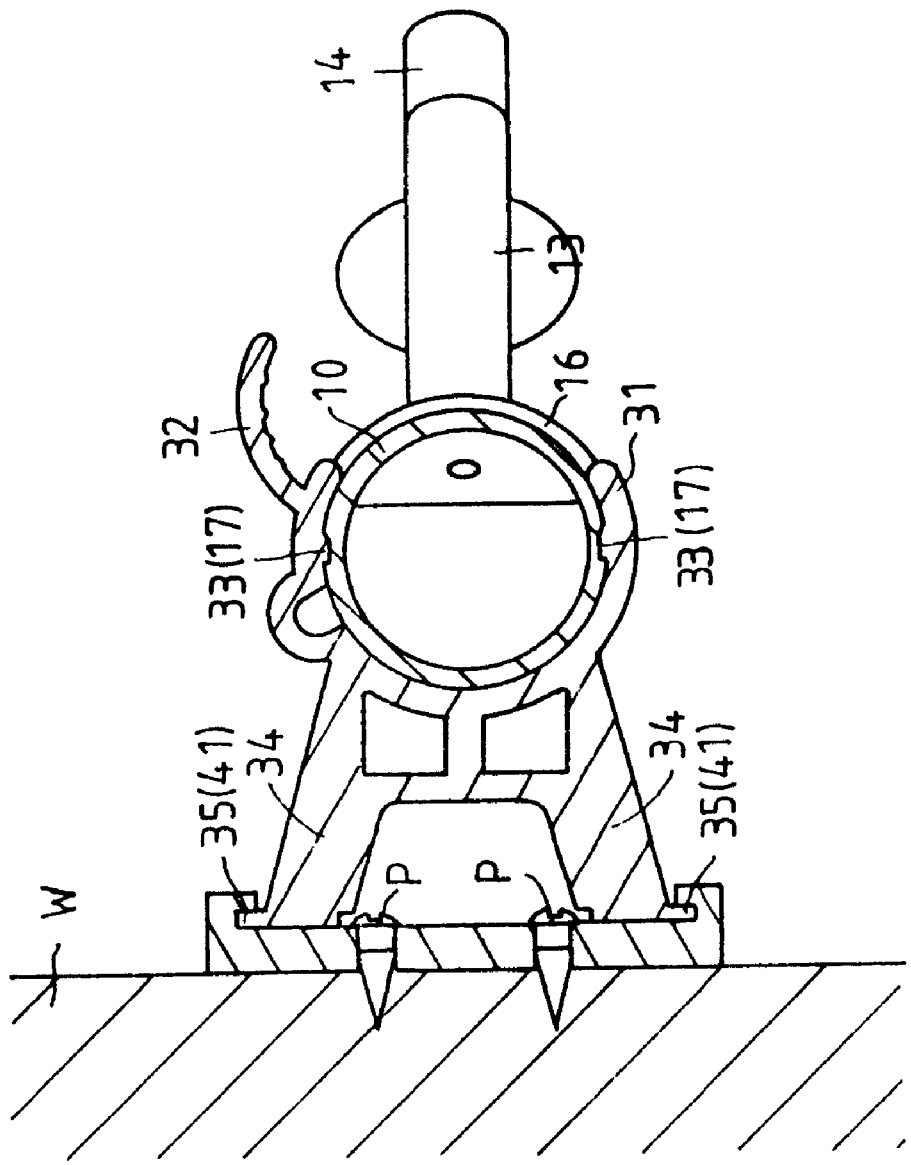
FIG. 2 is a sectional assembly view of an animal drinking device of a first preferred embodiment in accordance with the present invention.

Referring to FIGS. 1 and 2, a first animal drinking device comprises a water container 20, a water drawing device 10, a positioning clamp device 30, and a support plate 40. The water container 20 is disposed on the water drawing device 10. The positioning clamp device 30 clamps the water drawing device 10.

The water container 20 has an outer thread 21. The water drawing device 10 has a hollow tube 12, an inner thread 11 engaging with the outer thread 21, a hollow tube 12, a pipe 13 connected to the hollow tube 12, a middle annular flange 16, a lower annular flange 16', and two elongated recesses 17. The pipe 13 has an outlet 14 receiving a ball 15. Two opposite semicircular plates 131 are disposed on the pipe 13. The positioning clamp device 30 has two opposite arms 34, an elastic neck 31, a push bar 32, and two protruded bars 33. Each of the opposite arms 34 has a distal block 35. The support plate 40 has a notch 421, two guide grooves 41, and two through holes 42. The protruded bars 33 are inserted in the elongated recesses 17. Each distal block 35 is inserted in the respective guide groove 41. Two screws p fasten the support plate 40 on a wall W via the through holes 42.

Figure 3:
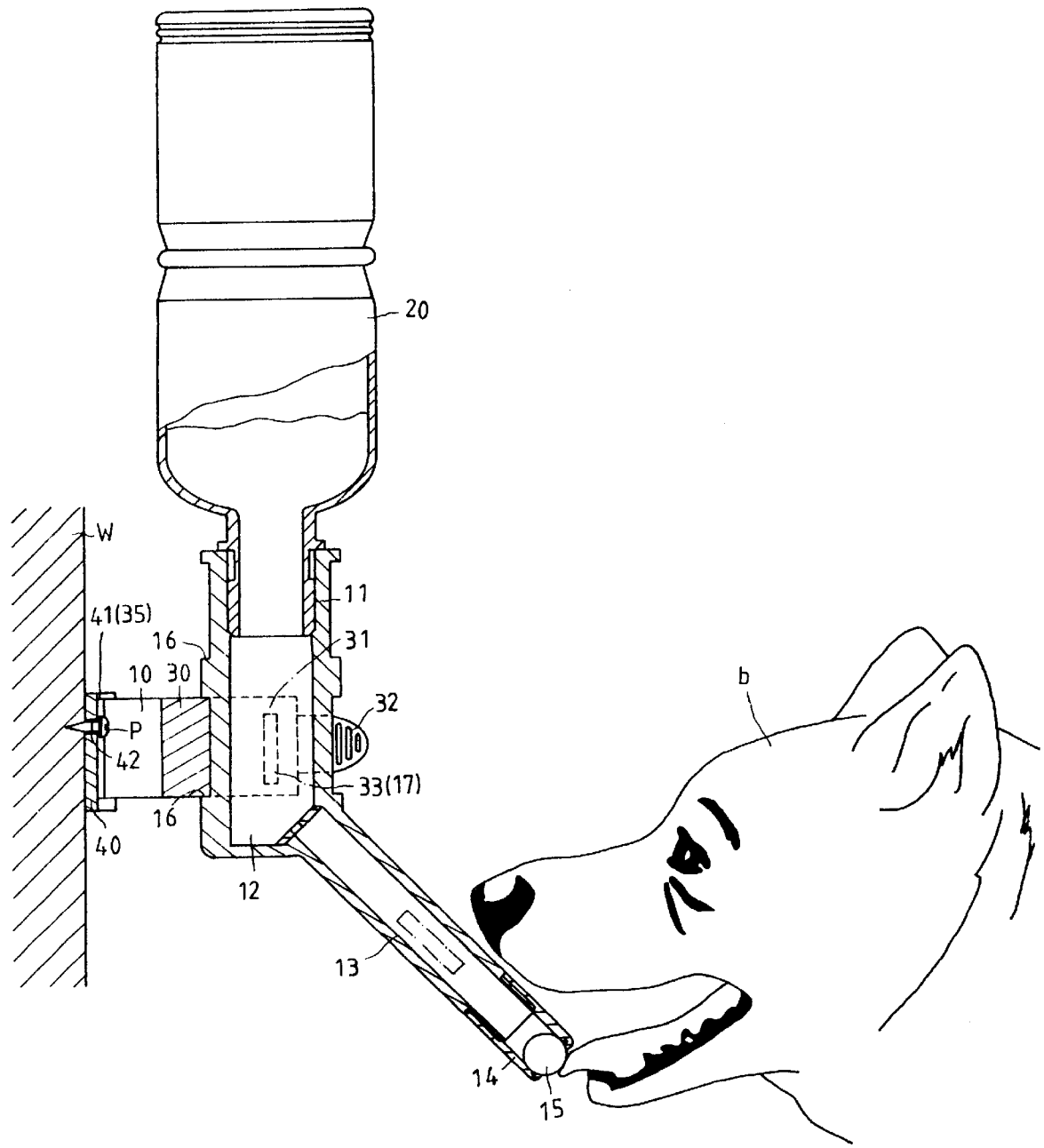
FIG. 3 is a schematic view illustrating an application of an animal drinking device of a first preferred embodiment in accordance with the present invention.

Referring to FIG. 3, a dog b uses a tongue touching the ball 15.

Figure 4:
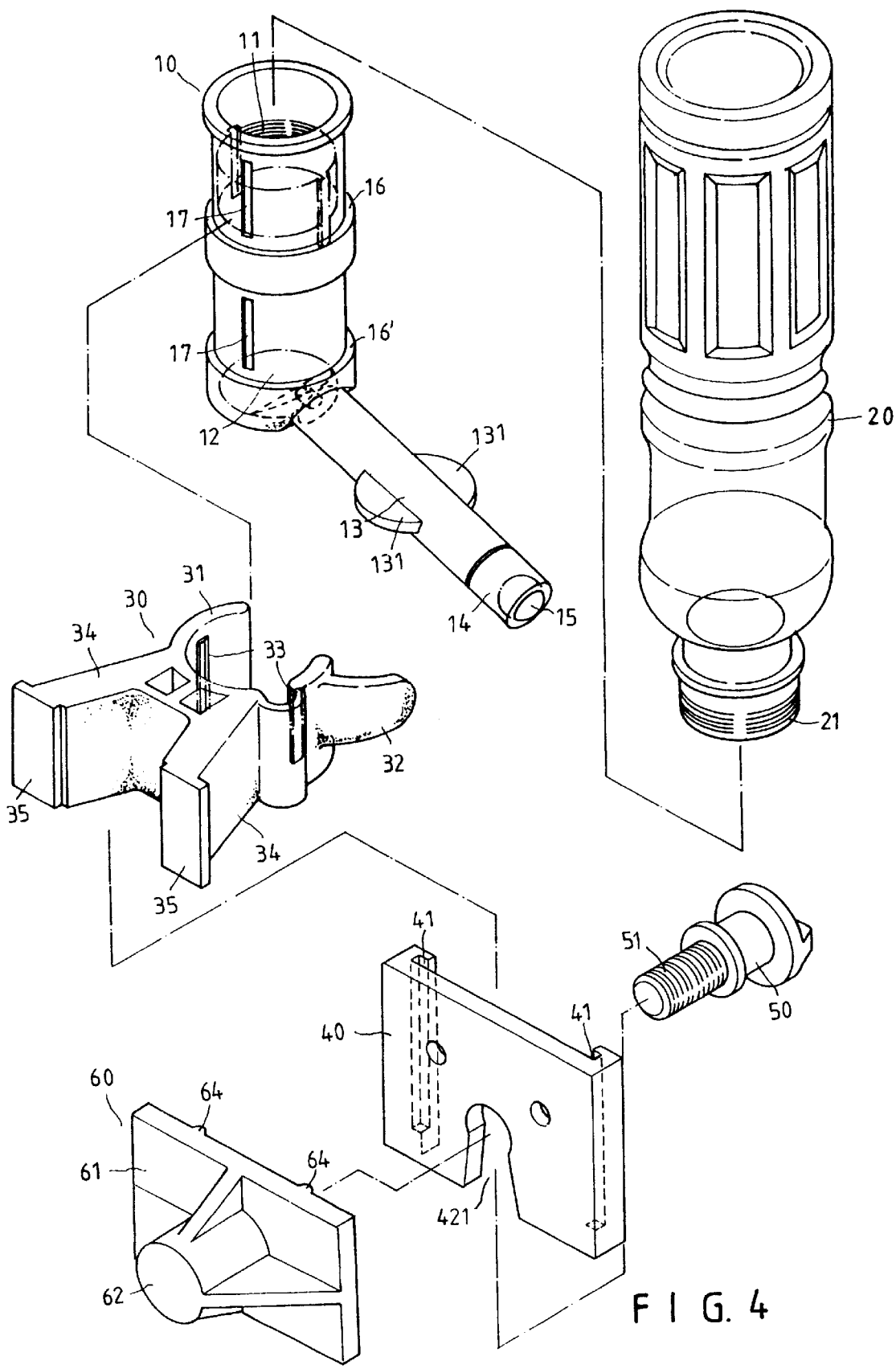
FIG. 4 is a perspective exploded view of an animal drinking device of a second preferred embodiment in accordance with the present invention.

Referring to FIGS. 4 and 5, a second animal drinking device comprises a water container 20, a water drawing device 10, a positioning clamp device 30, and a support plate 40. The water container 20 is disposed on the water drawing device 10. The positioning clamp device 30 clamps the water drawing device 10.

The water container 20 has an outer thread 21. The water drawing device 10 has a hollow tube 12, an inner thread 11 engaging with the outer thread 21, a hollow tube 12, a pipe 13 connected to the hollow tube 12, a middle annular flange 16, a lower annular flange 16', and two elongated recesses 17. The pipe 13 has an outlet 14 receiving a ball 15. Two opposite semicircular plates 131 are disposed on the pipe 13. The positioning clamp device 30 has two opposite arms 34, an elastic neck 31, a push bar 32, and two protruded bars 33. Each of the opposite arms 34 has a distal block 35. The support plate 40 has a notch 421, two guide grooves 41, and two through holes 42. The protruded bars 33 are inserted in the elongated recesses 17. Each distal block 35 is inserted in the respective guide groove 41.

The second animal drinking device further comprises a bolt 50 and a lock seat 60. The support plate 40 is disposed between the bolt 50 and the lock seat 60. The lock seat 60 has a main body 61, an inner threaded sleeve 62, and two elongated ribs 64. The bolt 50 has a threaded shank 51 inserted in the inner threaded sleeve 62 via the notch 421.

A plurality of rails d are clamped by the support plate 40 and the lock seat 60.

The present invention is not limited to the above embodiment but various modification thereof may be made. Furthermore, various changes in form and detail may be made without departing from the scope of the present invention.

I claim:

1. An animal drinking device comprises:

a water container, a water drawing device, a positioning clamp device, and a support plate, the water container disposed on the water drawing device, the positioning clamp device clamping the water drawing device, the water container having an outer thread, the water drawing device having a hollow tube, an inner thread engaging with the outer thread, a pipe connected to the hollow tube, a middle annular flange, a lower annular flange, and two elongated recesses, the pipe having an outlet receiving a ball, two opposite semicircular plates disposed on the pipe, the positioning clamp device having two opposite arms, an elastic neck, a push bar, and two protruded bars, each of the opposite arms having a distal block, the support plate having a notch, two guide grooves, and two through holes, the protruded bars inserted in the elongated recesses, each distal block inserted in the respective guide groove.

2. An animal drinking device as claimed in claim 1, wherein the animal drinking device further comprises a bolt and a lock seat, the support plate is disposed between the bolt and the lock seat, the lock seat has a main body, an inner threaded sleeve and two elongated ribs, and the bolt has a threaded shank inserted in the inner threaded sleeve via the notch.

* * * * *